United States Patent
Buesser et al.

(10) Patent No.: US 11,429,839 B2
(45) Date of Patent: Aug. 30, 2022

(54) ADAPTING MOVIE STORYLINES

(71) Applicant: International Business Machines Corporation, Armonk, NY (US)

(72) Inventors: Beat Buesser, Ashtown (IE); Adi I. Botea, Dublin (IE); Bei Chen, Blanchardstown (IE); Akihiro Kishimoto, Castleknock (IE)

(73) Assignee: International Business Machines Corporation, Armonk, NY (US)

(*) Notice: Subject to any disclaimer, the term of this patent is extended or adjusted under 35 U.S.C. 154(b) by 618 days.

(21) Appl. No.: 16/548,804

(22) Filed: Aug. 22, 2019

(65) Prior Publication Data
US 2021/0056407 A1 Feb. 25, 2021

(51) Int. Cl.
| | |
|---|---|
| *G06N 3/04* | (2006.01) |
| *G06N 3/08* | (2006.01) |
| *H04N 21/8541* | (2011.01) |
| *H04N 21/442* | (2011.01) |
| *G06F 16/735* | (2019.01) |

(52) U.S. Cl.
CPC ............ *G06N 3/04* (2013.01); *G06F 16/735* (2019.01); *G06N 3/08* (2013.01); *G06N 3/084* (2013.01); *H04N 21/44218* (2013.01); *H04N 21/8541* (2013.01)

(58) Field of Classification Search
None
See application file for complete search history.

(56) References Cited

U.S. PATENT DOCUMENTS

| | | | |
|---|---|---|---|
| 4,305,131 A | 12/1981 | Best | |
| 4,591,248 A | 5/1986 | Freeman | |
| 4,838,344 A | 6/1989 | Murakami | |
| 7,555,766 B2 | 6/2009 | Kondo et al. | |
| 7,698,238 B2 | 4/2010 | Barletta et al. | |
| 8,046,691 B2 | 10/2011 | Sankar et al. | |
| 8,775,161 B1 | 7/2014 | Nichols et al. | |

(Continued)

FOREIGN PATENT DOCUMENTS

| | | |
|---|---|---|
| CN | 103903003 | 2/2014 |
| CN | 108574701 | 12/2019 |

(Continued)

OTHER PUBLICATIONS

International Search Report (ISR) and Written Opinion of the International Searching Authority.

(Continued)

*Primary Examiner* — Tyler W. Sullivan
(74) *Attorney, Agent, or Firm* — Kurt Goudy; Lou Percello, Attorney, PLLC

(57) ABSTRACT

A neural network has an input layer, one or more hidden layers, and an output layer. The input layer is divided into a situation context input sublayer, a background context input sublayer (in some embodiments), and an environmental input sublayer. The output layer has a selection/sequencing output sublayer and an environmental output sublayer. Each of the layers (including the sublayers) have a plurality of neurons and each of the neurons has an activation. Situation context, environmental information, and background context can be inputted into the neural network which create an output used to dynamically select and sequence selected storylines that are used to modify a story based on the sentiment, environment, and/or background of the audience.

20 Claims, 6 Drawing Sheets

(56) References Cited

U.S. PATENT DOCUMENTS

| | | | |
|---|---|---|---|
| 9,146,904 | B2 | 9/2015 | Allen |
| 9,839,856 | B2 | 12/2017 | Crawford et al. |
| 11,176,484 | B1 * | 11/2021 | Dorner .................. G06F 16/738 |
| 11,354,542 | B2 * | 6/2022 | Yehezkel Rohekar ...................... G06K 9/6256 |
| 2013/0211855 | A1 | 8/2013 | Eberle et al. |
| 2013/0262092 | A1 | 10/2013 | Wasick |
| 2015/0071600 | A1 | 3/2015 | Azam |
| 2017/0092322 | A1 | 3/2017 | Kamhi et al. |
| 2017/0103783 | A1 | 4/2017 | Paglia et al. |
| 2017/0252648 | A1 | 9/2017 | Kim et al. |
| 2018/0255335 | A1 * | 9/2018 | George .............. H04N 21/4532 |
| 2018/0330733 | A1 | 11/2018 | Orr et al. |
| 2018/0367484 | A1 | 12/2018 | Rodriguez et al. |
| 2019/0243454 | A1 | 8/2019 | Sun et al. |
| 2020/0126533 | A1 * | 4/2020 | Doyle .................. G10L 15/1815 |
| 2021/0350346 | A1 * | 11/2021 | Edwards ................ G06Q 20/18 |
| 2022/0138995 | A1 * | 5/2022 | Baughman ......... G06Q 30/0205 345/619 |

FOREIGN PATENT DOCUMENTS

| | | |
|---|---|---|
| KR | 101355340 B1 | 7/2013 |
| WO | WO2019076845 | 4/2019 |

OTHER PUBLICATIONS

Augusto Baffa, Marcus Poggi, Bruno Feijo'. Adaptive Automated Storytelling Based on Audience Response. 14th International Conference on Entertainment Computing (ICEC), Sep. 2015, Trondheim, Norway. pp. 45-58, 10.1007/978-3-319-24589-8_4. hal-01758442.

Ramona Pringle—CBC News. Posted: Aug. 4, 2017 5:00 AM ET, Technology & Science—Analysis. Watching you, watching it: Disney turns to AI to track filmgoers' true feelings about its films.

Jufeng Yang, Dongyu She, Ming Sun, Proceedings of the Twenty-Sixth International Joint Conference on Artificial Intelligence (IJCAI-17), Joint Image Emotion Classification and Distribution Learning via Deep Convolutional Neural Network, College of Computer and Control Engineering, Nankai University, Tianjin, China.

Zhiwei Beng, et al., "Factorized Variational Autoencoders for Modeling Audience Reactions to Movies", Simon Fraser University, Disney Research, Caltech.

C. Grant, "Many Worlds: The movie that watches its audience," 2013. [Accessed Jun. 20, 2018] https://www.bbc.com/news/technology-21429437, copy of news article provided.

* cited by examiner

ADAPTING MOVIE STORYLINES

BACKGROUND

The fields of artificial intelligence and consumer electronics are converging with the film and entertainment industries to bring users video and audio content in multiple venues and through multiple pathways. Movies, concerts, and events are experienced not only at venues (like theaters, concert halls, and stadiums) and on television but also as media on computers and i-phones where the content can be consumed on-demand, continuously or intermittently, and at a variety of times, locations, and user situations.

However, typically this media is available only with unchangeable content and with a fixed sequence of events, images, audio, and/or speech. As such the media tends to be static and unchangeable and unresponsive to changes in the environment in which the media is presented and/or the context of the user/audience consuming the media. in many cases, once the content is made, there is no way to change the content based on the user/audience sentiment, context, or environment, e.g. the composition (demographic), number, feelings, and emotions of the user/audience; the background of the user/audience; and/or the parameters of the environment in which the media is presented.

There is a need to enable changes of media content and sequencing adaptable to user/audience sentiment, context, and environment.

SUMMARY

The present invention is a storyline control system including methods of training and methods of operating the system.

A neural network is used in the system. In some embodiments, the neural network is a convolutional neural network (CNN). The neural network has an input layer, one or more hidden layers, and an output layer. The input layer is divided into a situation context input sublayer, a background context input sublayer (in some embodiments), and an environmental input sublayer. The output layer has a selection/sequencing output sublayer and an environmental output sublayer. Each of the layers (including the sublayers) have a plurality of neurons and each of the neurons has an activation.

One or more situation context modules each has one or more context inputs from one or more sensors monitoring an audience and one or more sentiment outputs connected to the situation context input sublayer.

One or more environmental information modules has one or more environmental sensor inputs monitoring an audience environment and an environmental output connected to the environmental input sublayer.

In some embodiments, one or more background context modules has one or more background inputs including characteristics of the audience and a background output connected to the environmental input sublayer.

One or more selection modules connects to the selection/sequencing output sublayer and controls the selection of one or more selected storylines.

One or more sequencing modules connects to the selection/sequencing output sublayer and sequences the selected storylines so that the selected storylines modify a story before or as the story is played, e.g. by the storyline control system.

DETAILED DESCRIPTION

Figure 1:
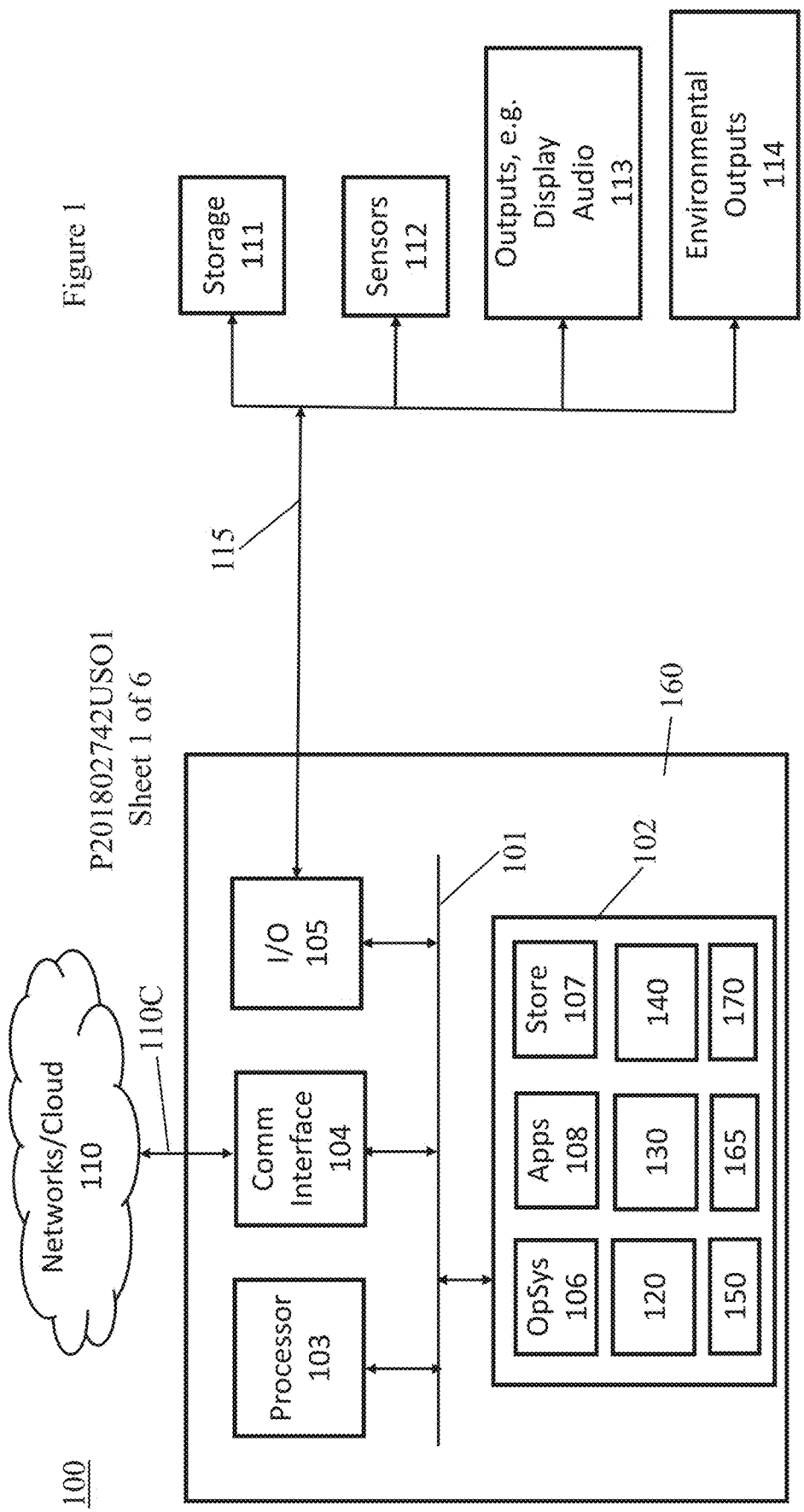
FIG. 1 is a block diagram of one architecture of the present invention.

The present invention relates to artificial intelligence and artificial reality. More specifically, the invention relates to dynamically changing and/or adapting one or more media (e.g. video and/or audio) streams based on a user/audience context and/or user/audience environment to result in an enhanced audience experience and/or to achieve the media provider's objectives more effectively.

Herein the term "audience" means one or more "user." The terms "user" and "audience" will be used interchangeably without loss of generality. As non-limiting examples, the audience context includes the user sentiment, composition (e.g. the demographics of the users age, education, status, social and political viewpoints), profiles (e.g. likes and dislikes), feelings, emotion, location, number, time of day, reactions to the environment, reactions to the media, and/or emotional state. In some embodiments, two kinds of user/audience context are used: background context and situation context.

Media means any sensory outputs of the system that cause one or more of the users to feel a physical sensation. Non-limiting examples of media include video, audio, speech, changes in room/space environment (e.g. air flow, temperature, humidity, etc.), smells, lighting, special effects, etc.

The environment or user/audience environment is the total of some or all the sensory outputs at any time outputted by the system.

The experience or audience/user experience is the sensory experience felt by the users/audience at any time caused by the environment, including the media/story being played.

One or more of the media comprises stories with each story having one or more "storylines", e.g. subcomponents, or segments. The storylines have a start and an end. Typically, the storylines are played, e.g. outputted on one or more output devices in a sequence to create one or more stories and an associated environment that is part of the story. One or more second storylines of the same and/or different media can begin or end based on the beginning/end and/or at a queue in a first storyline, For example, a first video storyline plays a sequence of images of "Little Red Riding Hood" (Red) walking to the front door of "Grandma's" house. When "Red" opens the door (a queue in first video storyline), a first audio storyline starts playing and makes the sound of a door opening. After the door opens, the first video and first audio storyline end, e.g. at an end point. At the end point of the first video and first audio storyline, a second video storyline begins (at its start point) playing a sequence of images showing "Red" walking into the house. in the middle of the second video storyline, "Red" sees the "big, bad wolf." This queue point in the second video storyline queues the start of a second audio segment (at its start point) of ominous music and a first control system storyline that dims the lighting and turns the audio volume up.

The content, selection, and sequencing of these storylines drives one or more system outputs to create a dynamic user/audience environment while the story is playing. When the content, selection, and environment changes in time, the user/audience experience changes in time.

A "story" is a selection of one or more storylines played in storyline sequence. Each storyline has one or more storyline contents. Each storyline is played/outputted in one or more media types, e.g. video, audio, environmental changes (temperature, air flow), smells, lighting, etc. The storyline selection, storyline contents, and storyline sequencing all effect the user/audience environment and experience. Accordingly, changing any of the storyline selection, content, and/or sequencing changes the user/audience environment and experience during the story. The change in environment and experience causes the user context to change which is inputted to the system and in turn again can change the storyline selection, content, and/or sequencing.

The present invention is a system and method that enables story modification by storyline selection and sequencing in the story in real time during delivery and/or playing of the story to the user/audience. The story modifications can be based on the situation context (e.g. user/audience experience), environment, and/or background context.

In some embodiments, the system monitors/inputs user/audience context and determines how to change the selection and/or sequencing of one or more of the storylines to change the story and/or environment and therefore the audience experience. In some embodiments, the changes are made based on some criteria, e.g. objectives of the media provider for experience creation, message delivery, and/or measurement of audience/user reaction.

In some embodiments, two kinds of user/audience context are used: background context and situation context. Background context of the user/audience is context that exists prior to playing the story. Non-limiting examples of background context includes user composition (e.g. the demographics of the users—age, education, socio-economic status, income level, social and political viewpoints), user profiles (e.g. likes and dislikes), time of day, number of users in the audience, weather, and location of the audience. Non-limiting examples of situation context include the sentiment of one or more users in the audience like feelings, emotion, reactions to environment (e.g. verbal statements about the environment/story, facial expression reactions, etc.).

The system can gather background context information about one or more users in the audience. This information can be gathered from social media, user input, monitoring user use of the system, image recognition, etc. In some embodiments, background context information including non-user information, e.g. weather, is imputed. Background context information can be retrieved from calendars, system clocks, network searches, etc. Information from user surveys can be used.

In addition, the system monitors and inputs the situation context. In some embodiments, situation context is gathered from facial recognition systems used to identify expressions and/or user feelings. In some embodiments, the system analyzes audio inputs for word usage, meaning, expression, volume etc. to determine emotional state. In some embodiments, the system can measure, record, infer, and/or predict audience reactions (e.g. by facial recognition and analysis and audio analysis) to changes in environmental inputs, media type, and/or the story and storyline media content as the storyline selection and sequencing change.

While the sequence of storylines is presented in the story, the system monitors environmental inputs like sounds, sound levels, light levels, light frequency, smells, humidity, temperature, air flow, etc.

In preferred embodiments, a neural network is used. During a training phase, training data including situation context information, background context information, and/or environmental information is inputted to the neural network. The neural network is trained using known backwards propagation techniques as described below.

During training, input is entered into the input layer and the output of the output layer is compared to a desired result. The differences are used, e.g. in minimizing a cost function, to determine how to modify internals of the neural network. The input is entered again and the new output is compared to the desired output. The process iterates until the system is trained.

During an operational phase, outputs of the neural network control the selection and sequencing of storylines and environmental outputs to produce one or more stories that play as media. The resulting story is played for an audience (or model of an audience) to create an environment.

During operation, the audience experience is monitored and the storyline selection, and/or sequencing (including environmental storyline outputs) change as determined by the trained neural network. To change a story, a selection controller modifies storyline selection and a sequence controller modifies the sequence of storylines to produce a modified story. The modified story might have storylines that are added, deleted, and/or changed as compared to storylines in the prior story.

A trained system is more able to select and sequence storylines and environmental outputs to create one or more audience experiences more predictably during an operational phase. An operational system can create a story, monitor the audience experience, and dynamically change selection and sequencing of one or more storylines (including environmental outputs) based on the instantaneous audience experience to create different environments and story outcomes for audiences with predictable audience reaction/response. These modifications can be made for future stories or can occur "on-the-fly" while a story is playing.

In some embodiments, it is again noted that the operational system is trained to provide outputs based on the audience experience factoring in the dynamic background context, situation context, and/or environment.

The present invention can increase the engagement of an audience with the media (e.g. a movie) by adapting its storyline using artificial intelligence with the objective of making the experience more exciting, thrilling, influential, etc, for the audience.

The present invention can increase the number of views of a media presentation (e.g. a movie) because the viewing experience is more intense since the adapting story lines will change the media presentation depending on the background context and situation context to cause an improvement in audience experience, e.g. as measured by achieving goals of the media provider. These goals include selling more tickets, having more network views, and/or reaching a more diverse audience.

The present invention can monitor and record the audience experience to one or more storylines or stories, e.g. by measuring the situation context, background context, and/or the environment and storing this information, e.g. on external storage, for later analysis and use.

In some embodiments, a convolutional neural network (CNN) is used to modify the storyline selection and/or sequencing and/or the environmental controls.

Referring now to the Figures, particularly FIG. 1 which is a block diagram of one architecture 100 of the present invention.

In one embodiment, a control system 160 is connected 110C to one or more networks, cloud environments, remote storage and/or application servers 110. The network connection 110C can connect to any standard network 110 with any known connection with standard interfaces 110C, including Internet, Intranet, wide area network (WAN), local area network (LAN), cloud, and/or radio frequency connections, e.g. WiFi, etc.

The network connection 110C is connected through a communication interface 104 to components of the control system 160 by any known system bus(es) 101, Among other things, media data can communicate to and from the system 160 through the communication interface 104.

One or more computer processors, e.g. central processing units (CPUs) 103, co-processors 103, and/or Graphical Processing Units (GPUs) are connected to the system bus 101.

One or more input/output (I/O) controllers 105 is connected to the system bus 101. The I/O controllers 105 are connected to one or more I/O connections 115. The I/O connections/bus(es) 115 connect I/O devices either by hard wiring or wireless, e.g. radio frequency, optical connections, etc. Examples of I/O devices include external storage 111 (e.g. portable data storage like CD/DVD devices, external hard drives, cloud storage, etc.); one or more input sensors 112; one or more displays 113, e.g. a graphical user interface (GUI); and one or more other controllers 114, e.g. environmental controllers. Media content and/or storyline information can be communicated over the network connection 110C and/or connections 115, e.g. with the external storage 111, display/GUI 113, and other (e.g., environment) outputs 114.

One or more memories 102 are connected to the system bus 101 as well. System software 106, e.g. one or more operating systems; operational storage 107, e.g. cache memory; and one or more application software modules 108 are accessibly stored in the memory 102.

Other applications can reside in the memory 102 for execution on the system 160. One or more of the functions of these applications also can be performed externally to the system 160 with results provided to the system 160 for execution. The situation context module 120 analyzes inputs affecting situation context while a storyline or story plays. The background context module 130 analyses background context information. The environmental module 140 analyses effects of the environment while the storyline or story plays. The selection module 150 selects storylines to play. The sequencing module 165 selects the sequence the selected storylines are played. Output of the selection module 150 and sequencing module 165 can be performed prior to playing the story or dynamically while the story is playing based on the analysis of the situation context 120, background context 130, environment information 140, and/or system configuration. The environmental module 170 coordinates environmental outputs with the selected and sequenced storylines and programs and controls environmental outputs through the I/O controller 105.

Figure 2:
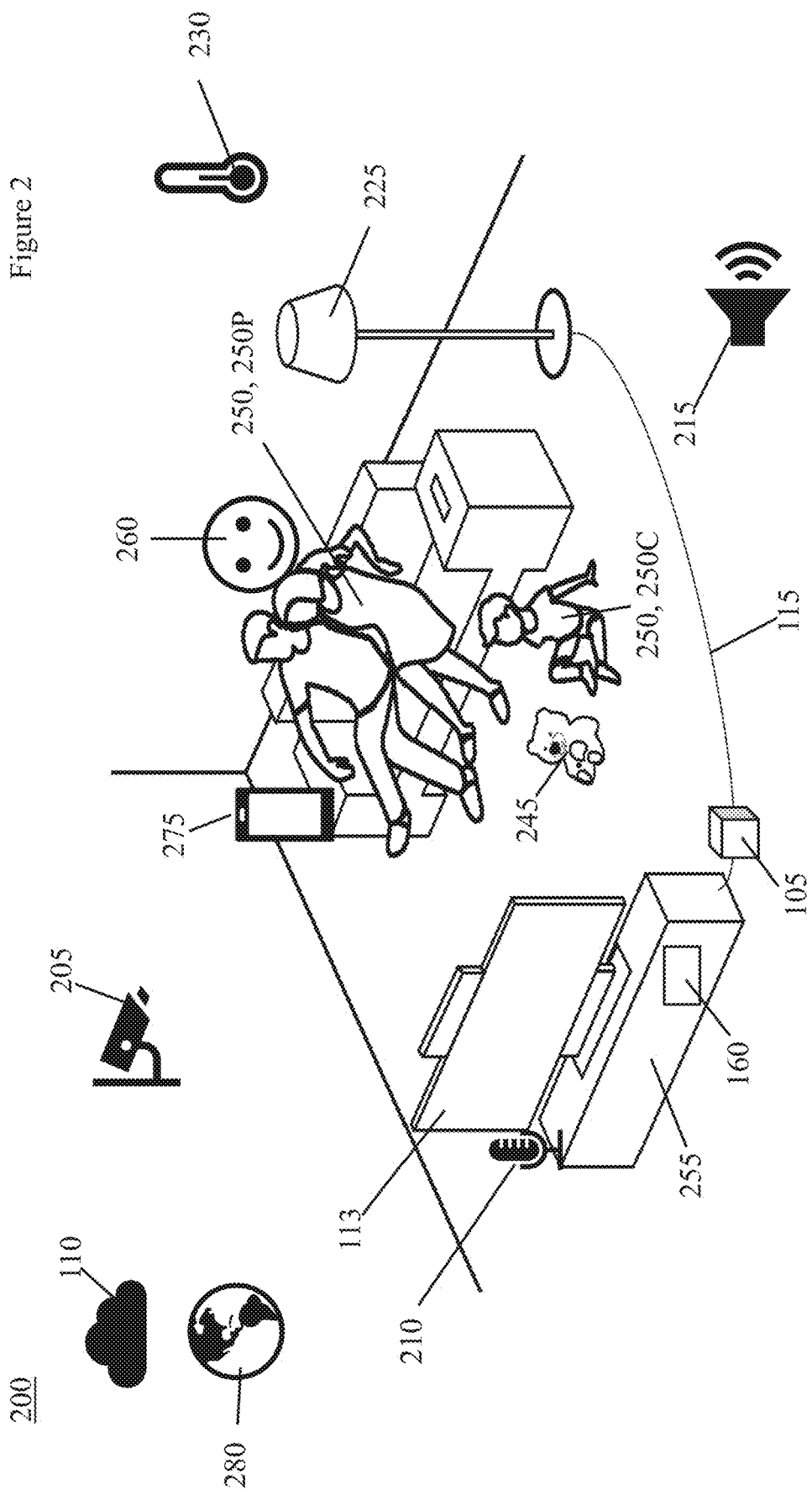
FIG. 2 is a diagram of one or more users in an environment.

FIG. 2 is a diagram of one or more users/audience 250 in a user environment 200. The environment 200 comprises a space with one or more inputs and one or more outputs. Inputs include sensors 112 like image capture devices (e.g. cameras) 205, audio capture devices 210 (e.g. microphones 210), and graphical user interfaces (GUI) 113. Inputs also include environmental inputs like temperature detectors 230, humidity detectors (not shown) 112, and location detectors 280. Outputs include GUIs 113, televisions, displays, home entertainment systems 255, and audio output devices (e.g. speakers) 215. Some environmental outputs (e.g. 225) are controlled by environmental controllers 105, e.g. through buses 115, to control environmental parameters including lighting 225, temperature, humidity, and air flow.

Ancillary devices like cellular phones 275, data assistants, monitors (e.g. "fit bits", and heart rate monitors), blood pressure monitors, respiration detectors, motion detectors, and computers can provide inputs and/or outputs to users, typically 250. inputs like microphones 210, temperature sensors 230, cellular phones 275, and cameras 205 and outputs like speakers 215, cellular phones 275, and lighting 225 can be located anywhere in the environment 200 including in a toy 245, etc. The inputs and outputs can be hard wired, e.g. with buses 115, or connected wirelessly.

The audience (typically 250) comprises one or more users 250. The users 250 have different characteristics. For example, one user 250 might be a parent 250P and another user 250 might be younger person 250C. The audience 250 can be varied. Non-limited examples of an audience 250 include one or more of the following: family members viewing TV, a group seeing movie, a group playing a video game; a crowd at an entertainment venue; a commercial audience, a classroom of students; a group at a theme park; a movie theatre audience; and people attending an athletic or political event.

The control system 160 can be located anywhere there is connection to the 110 devices (112, 113, 114, etc.) For example, the control system 160 can be located within the entertainment system 255. In some embodiments, the control system 160 is connected 110C (either wired or wireless) through the communication interface 104 to one or more networks/clouds 110.

Sensors 112 capture signals (e.g. images and audio), particularly from the users 250 that are provided over the bus connections 115 to respective I/O controllers 105. The signals are processed and the content of the received signals is analyzed by one or more of the situation context module 120, background context module 130, and the environmental module 140. In some embodiments, information is also received from one or more of the networks/cloud 110, user inputs through interfaces 113, sensors and/or inputs from ancillary devices like the cell phone 275 and storage 111.

Using these inputs, the situation context module 120, background context module 130, and the environmental module 140 determine the situation context 260, background context, and environmental parameters (e.g. temperature, sound volume, lighting levels, humidity, etc.) in the environment 200.

Non-limiting examples are presented.

Stereoscopic cameras 205 provide signals to the situation context module 120 that performs body pose recognition for the situation context module 120 to determine one or more user 250 reactions 260 like surprise, laughter, sadness, excitement, etc.

Cameras 205 provide signals to the situation context module 120 that performs facial recognition to determine user 250 reactions 260 based on facial expressions.

Infrared cameras 205 provide signals to the situation context module 120 that determines body and facial temperature representing user 250 reactions 260.

A thermometer 230 sensor 112 provides signals to the environmental module 140 to measure ambient temperature, an environmental parameter, of the environment 200.

A microphone 210 provides signals to the environmental module 140 to determine ambient sound levels in the environment 200.

A microphone 210 provides signals to the situation context module 120 that performs speech and sound (e.g. crying, laughing, etc.) recognition, Natural Language Processing (NLP) can be used to determine one or more user 250 reactions 260. In some embodiments, the situation context module 120 performs NLP to detect key phrases referring to the playing story, The NLP can detect user 250 spoken phases that indicate user 250 expectation and/or user sentiment about the story progression and/or ending.

Using image data received from sensors 112, the situation context module 120 can perform age recognition which might give an indication of user 250 reactions 260.

The situation context module 120 can use motion data (e.g. rapid motions, no motion, gait, etc.) from motion sensors 112 to determine user reaction 260.

The background context module 13( )uses information received from the network 110, user input 113 (e.g. user surveys) and/or stored memory 111 to form a user profile of one or more of the users 250. Information can be gathered from statements and activity on social media accounts, information about user groups and friends on social media, user search activity, web sites visited, product information requested, items purchased etc, Similar information can be accessed from activities on ancillary devices like cellular phones 275. Of course, proper permissions and access privileges need to be obtained when accessing this information.

The output of the situation context module 120 is a set of sentiments and/or user reactions each with a reaction value/score representing a level of the sentiment/reaction 260 for in one or more of the users. This represents a sentiment status or sentiment pattern of each of the users 250. In sonic embodiments, this sentiment pattern/status is inputted to a situation context sublayer 452 in a neural network 400 as described in FIG. 4. In some embodiments, first the users 250 are classified according to their sentiment status. In some embodiments, an aggregator aggregates the sentiment/reactions 260 of a plurality of users 250 to determine an aggregate set of sentiments/reactions 260 and respective values to represent the sentiment status of one or more groups (250P, 250C) in the audience 250 and/or the entire audience 250. The sentiment status can change while the story is played.

The output of the background context module 130 is a user profile of one or more of the users 250. Each user profile has a plurality of user characteristics with an associated characteristic value/score representing a level of each of the user characteristics for a given user 250. In some embodiments, the user profiles are grouped by degree of similarity. In some embodiments, a profile aggregator aggregates the profiles of a plurality of users 250 to determine an aggregate profile with respective profile values/scores to represent the profile of one or more groups (250P, 250C) in the audience 250 and/or the entire audience 250. The profiles may can change while the story is played but in some embodiments changes in profiles are expected to be less dynamic. In some embodiments, the profile of characteristics is inputted as a pattern of activations 410 to a background context sublayer 454, as described in FIG. 4.

The output of the environmental module 140 is an environmental profile of the environment 200. The environmental profile has a plurality of environmental parameters each with an associated parameter value/score representing a level each parameter has in the environment 200 at a given time. The environmental profile changes while the story is played. The control system 160 also can change the environment 200 and therefore the environmental profile by changing the selection and sequencing of storylines. In some embodiments, the environmental profile of environmental parameters is inputted as a pattern of activations 410 to an environmental sublayer 456, as described in FIG. 4.

Figure 3:
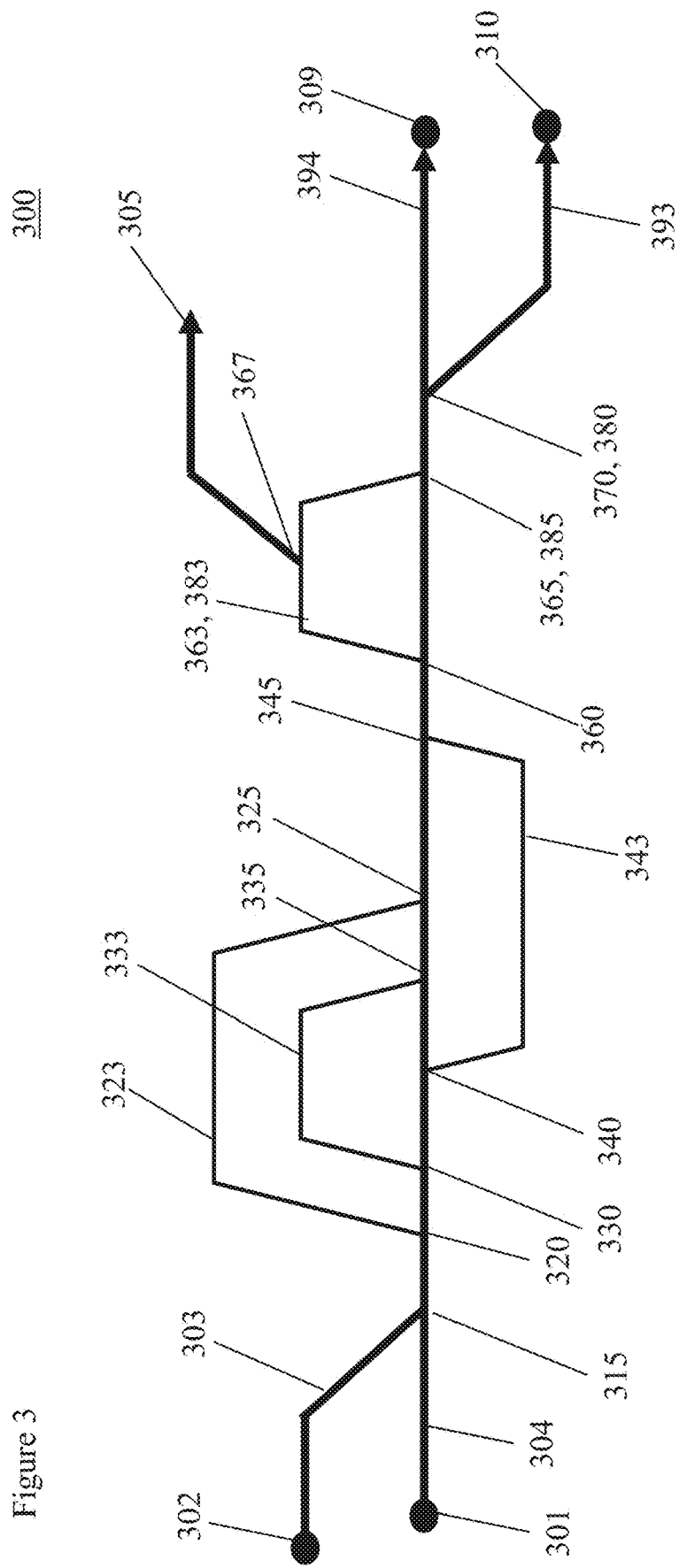
FIG. 3 is a story with one or more main storylines and one or more alternative storylines including a start, an alternate start, diverging points, an ending, and an alternative ending.

FIG. 3 is a story 300 with one or more main storylines (304, 394) and one or more alternative storylines 383 including a start 301, an alternate start 302, diverging points 380, an ending 309, and an alternative ending 310.

FIG. 3 is a diagram of a story 300 with one or more storylines (303, 323, 333, 343, 363, 393, typically 383) of a main storyline or story from start 301 directly to end 309. There are storylines 383 that define the first story and alternative storylines 383. Alternative stories develop from the first or original story by adding, inserting, and/or deleting storylines 383 in the first/original story.

The story 300 has a start, e.g. 301, and ending 309. There can be alternative starts 302 and alternative endings 310.

In addition, there are divergent points. Divergent points are points in the story 300 where the story 300 can be changed by inserting, deleting, or adding a storyline 383. In some embodiments, alternative storylines 383 start and end at divergent points, e.g. 340 and 345, and change the content of the original story without changing a continuity of the story.

Divergent points usually coincide with a storyline start, e.g. 320, 330, 340, 360, and 370, typically 380, or a storyline end 315, 325, 335, 365, typically 385. By matching a storyline start 380 with a divergent point and matching the storyline end 385 with a divergent point, the story 300 can change by playing the inserted storyline (with a start and end coinciding with a divergent point) instead of the former storyline in the sequence.

For example, the story 300 is originally sequenced to start at 301 and to play storyline 304 between point 301 and the divergent point 315. The system can change the story 300 by beginning with the start 302, playing storyline 303 instead of storyline 304, and ending the storyline 303 at the divergent point 315 that is in common with the ends of both storylines 303 and 304, By substituting storyline 303 for storyline 304 the control system 160 has changed the selection (selecting 304 not 303) and sequence (playing 304 first and not playing 303) of the storylines 383 in the story 300.

As a further example, assume the original story 300 starts at 301 and continues by playing a single storyline between the start 301 directly to the end 309. This original story can change in many ways by selecting different storylines in a different sequence. The story can start at 301 and continue until the divergent point 320, where storyline 323 is selected and played until divergent point 325. Alternatively, the original story can start at 302 and continue to divergent point 330 where the system 160 selects storyline 333 and returns to the original storyline at divergent point 335. Still again the system can play the storyline starting at 301 and the system 160 selects storyline 343 to begin at divergent point 340 and enters back into the original storyline at divergent point 345. Shorelines 393 and 394 provide alternative endings (either 309 or 310) in the story 300 depending on which story ending the system 160 selects and plays at divergent point 370. It is noted that there can be divergent points 367 within an alternate storyline (e.g., 363), e.g. at a queue point, that can start or end another storyline 305.

By "playing" a storyline 383 one or more outputs is enabled to provide media to the audience 250 as described above that corresponds to selected storyline 383 that sequenced and played.

Figure 4:
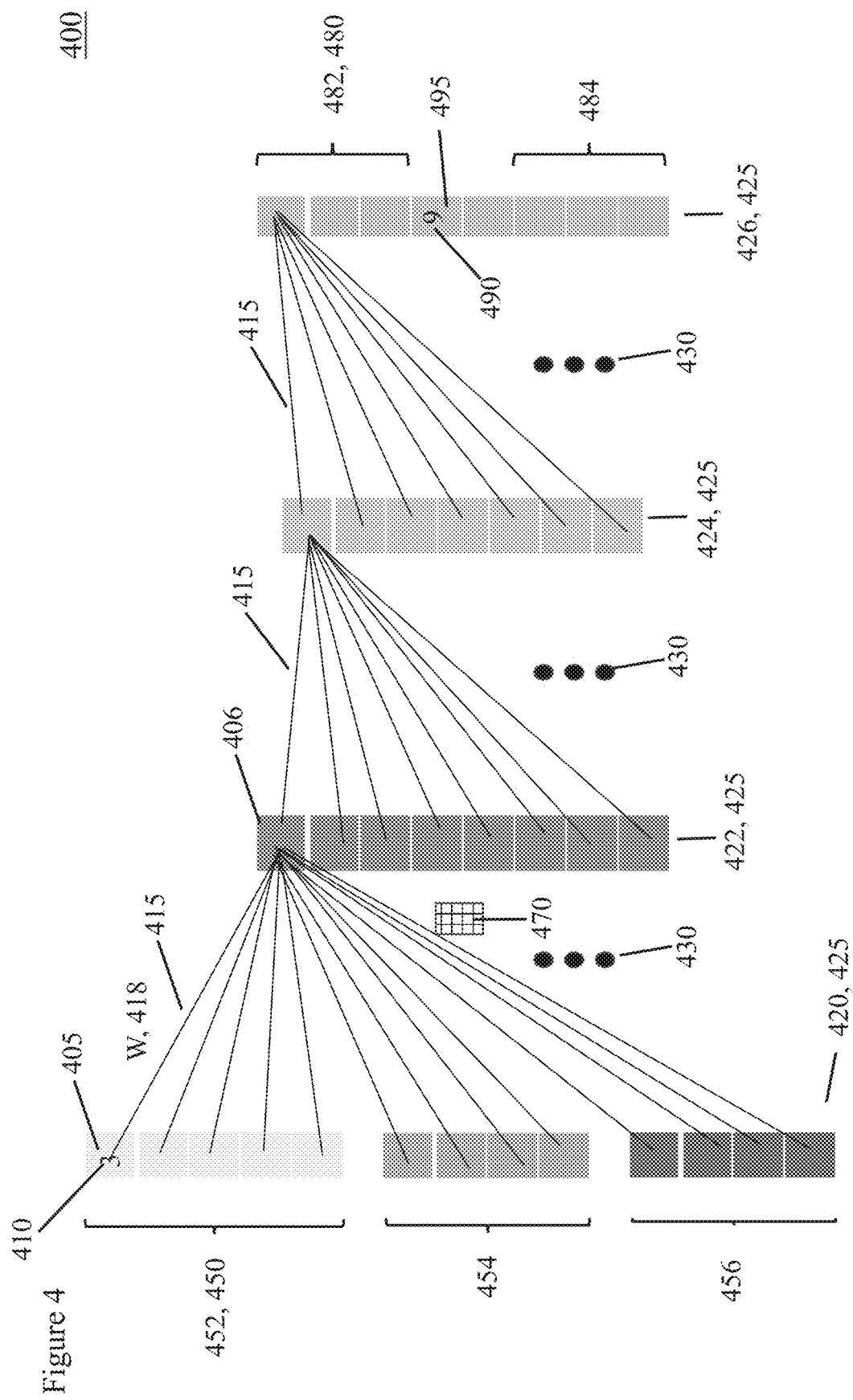
FIG. 4 is a system architectural drawing of a neural network embodiment of the present invention.

FIG. 4 is a system architectural drawing of one embodiment of a neural network 400 of the present invention.

The neural network 400 comprises a plurality of neurons, typically 405. Each of the neurons 405 can store a value called an activation 410. For example, neuron 405 holds an activation 410 of value "3". Most of the neurons and activations have no reference number in FIG. 4 for clarity.

The neural network 400 comprises a plurality of layers, e.g. 420, 422, 424, 425, and 426, typically 425. There is a first layer or input layer 420 and a last layer or output layer 426. Between the input 420 and output 426 layer there are one or more hidden layers, e.g. 422, 424. Each of the layers 425 has a plurality of neurons 405. In some embodiments, the number of layers 425 and the number of neurons 405 in each of the layers 425 is determined empirically by experimentation.

In some embodiments, all the neurons in a previous layer are each connected by an edge 415 to each one of the neurons of a next layer. For example, a typical neuron 406 in a next (hidden) layer 422 is individually connected to each of the neurons 405 in the input layer 420 by an edge 415. In some embodiments, one or more of the edges 415 has an associated weight, W 418. In similar manner 430, each neuron 406 in a next layer, e.g. 422, is connected individually by an edge 415 to every neuron 405 in a previous layer, e.g. 420. The same type of connections 415 are made between each neuron in the second hidden layer 424 to each neuron of the first hidden layer 422 and likewise between each neuron 495 of the output layer 426 and all the neurons of the second hidden layer 424. These connections 430 are not shown in FIG. 4 for clarity.

In some embodiments, the activation 410 in each neuron 406 is determined by a weighted sum of the activations 410 of each connected neuron 405 in the previous layer. Each activation 410 is weighted by the weight (w, 418) of the edge 415 each connecting the neuron 406 to each of the respective neurons 405 in the previous layer, e.g. 420.

Accordingly, a pattern of activations 410 in a previous layer, e.g. 420, along with the weights (w, 418) on each edge 415, respectively, determine the pattern of activations 406 in the next layer, e.g. 422. In like manner, the weighted sum of set of activations 406 in the previous layer, e.g. 422, determine the activations of each neuron, typically 405, and therefore the activation pattern of neurons in the next layer, e.g. 424. This process continues until there is a pattern of activations represented by the activation, typically 490, in each of the neurons 495 in the output layer 426. Therefore, given a pattern of activations 405 at the input layer 420, the structure of the neural network 400, the weights (w, 418) and biases, b, (described below) determines an activation output pattern that is the activation of each of the neurons 495 in the output layer 426. The set of activations in the input layer 420 are changing and therefore the set of activations in the output layer 426 are changing as well. The changing sets of activations in the hidden layers (422, 424) are levels of abstraction that may or may not have a physical significance.

In some embodiments, the input layer 420 is subdivided into two or more sublayer 454, and 456, typically 450.

Input sublayer 452 is a situation context sublayer 452 and receives activation 410 from the output of the situation context module 120. The pattern of activations 410 at the input layer 452 represent a status of the sentiment/reaction 260 of the audience 250. For example, the neurons 405 of the situation context sublayer 452 represent reactions like audience happiness, excitement, apprehension, etc.

Input sublayer 454 is a background context sublayer 454 and receives activations 410 from the output of the background context module 130. Activations 410 of neurons 405 in the background context sublayer 454 represent values/scores of characteristics in a user/audience 250 profile. In some embodiments, the pattern of activations 410 at the background context sublayer 454 represent the background context status at a point in time of the user/audience 250 profile of characteristics.

Input sublayer 456 is an environmental sublayer 456 and receives activations 410 from the output of the environmental module 140. Activations 410 of the neurons 405 in the environmental sublayer 456 are values/scores representing environmental parameters in an environmental profile. In some embodiments, the pattern of activations 410 in the environmental sublayer 456 represent the environmental profile status as it changes in time while the story is played.

In some embodiments, the output layer 426 is subdivided into two or more sublayers, e.g. 482 and 484, typically 480.

Output sublayer 482 has neurons 495 that determine which storylines are selected and when each of the selected storylines starts and ends, e.g. at a divergent point (380, 385).

Output sublayer 484 has neurons 495 that determine how the control system 160 controls the I/O devices, particularly the environmental outputs 114 to change the environment 200.

One mathematical representation of the transition from one layer to the next in the neural network 400 is as follows:

$$\begin{bmatrix} a_0^1 \\ a_1^1 \\ \vdots \\ a_n^1 \end{bmatrix} = \sigma \left( \begin{bmatrix} w_{0,0} & w_{0,1} & \cdots & w_{0,k} \\ w_{1,0} & w_{1,1} & \cdots & w_{1,k} \\ \vdots & \vdots & & \vdots \\ w_{n,0} & w_{n,1} & \cdots & w_{n,k} \end{bmatrix} \times \begin{bmatrix} a_0^0 \\ a_1^0 \\ \vdots \\ a_k^0 \end{bmatrix} + \begin{bmatrix} b_0 \\ b_1 \\ \vdots \\ b_n \end{bmatrix} \right) \text{ or } a^1 = \sigma(W \, a^0 + b)$$

Where $a_n^1$ is the activation 410 of the nth neuron 406 in the next level, here level 1; $W_{n,k}$ is the weight (w, 418) of the edge 415 between the kth neuron 405 in the current level, here level 0, and the nth neuron 406 in the next level, here level 1; and $b_n$ is the bias value for the weighted sum of the nth neuron 406 of the next level. In some embodiments, the bias value can be thought of as a threshold value for turning on the neuron.

The term a is a scaling factor. For example, the scaling factor can be the sigmoid function or the rectified linear unit, e.g. ReLU (a)=max (0, a).

The neural network is trained by finding values for all the weights (w, 418) and biases, b. In some embodiments, known backward propagation methods are used to find the weight and bias values.

In some embodiments, to start the training, the weights and biases are set to either random values or some initial value set. The output, i.e. the activation pattern of the output layer 426 is compared to a desired result. A comparison of the actual output to the desired result through a cost function (e.g. the square root of the sum of the squares of the differences) measures how close the output is to a desired output for a given input. The cost function is minimized, e.g. by a gradient descent method, through an iterative process to determine how to change the weights and biases in magnitude and direction to approach the desired output. The weights and biases are changed, i.e. backward propagated, and another iteration is done. Multiple iterations are done until the output layer produces an activation pattern that is close to the desired result for a given activation pattern imposed on the input layer.

In alternative embodiments, the neural network is a convolutional neural network (CNN). In the CNN one or more of the hidden layers is a convolutional layer where a convolution is performed using one or more filters to detect, emphasize, or de-emphasize patterns in the layer. There are different filter types, e.g. to detect sub-shapes in images and/or sound sub-patterns. In preferred embodiments, the filter 470 is a matrix of values that convolves over the inputs to the layer to create a new pattern of inputs to the layer.

Figure 5:
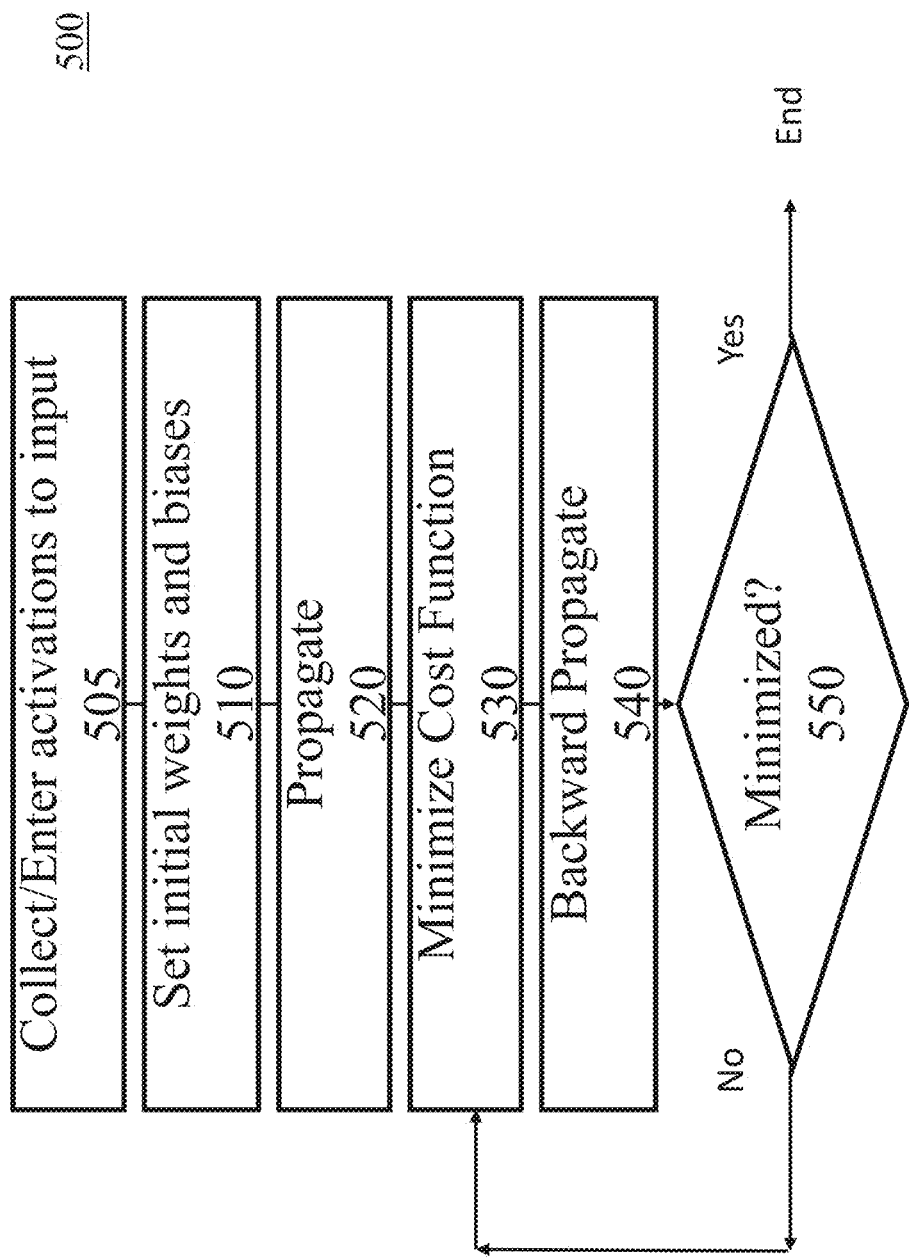
FIG. 5 is a flow chart of a training process used to train one embodiment of the present invention.

FIG. 5 is a flow chart of a training process 500 used to train one embodiment of the present invention.

The training process 500 begins with an untrained neural network. A pattern of initial activations is entered 505 into the input layer 420 from the situation context module 120, the background context module 130, and the environmental module 140. Alternatively, the inputs can be simulated.

For example, the output of the situation context module 120 is entered 505 to the situation context sublayer 452 as the pattern of activations 410 representing the status of the sentiment/reaction 260 of the audience 250. The output of the background context module 130 is entered in the background context sublayer 454 as the pattern of activations 410 representing the status of the background context status at a point in time, i.e., the status of the user/audience 250 profile of characteristics. The output of the environmental module 140 is entered 505 into the environmental sublayer 456 as a pattern of activations 410 representing a status of the environmental parameters in an environmental profile.

The weights 418 and bias, b, are initially set in step 510.

The activations 410 are propagated to the output layer 426 in step 520.

In step 530, the output of sublayer 482 is compared to a desired selection and sequencing of storylines. Further the output of sublayer 484 is compared to a desired configuration of environmental outputs. A cost function is minimized to determine the magnitudes and direction of the changes needed for a set of new weights 418 and biases, b.

In step 540, the new weights 418 and biases, b, are backwardly propagated by known methods and a new set of outputs (482, 484) is received.

After re-entering the input activations, a check is done in step 550. If the outputs of sublayers 482 and 484 are within a tolerance of a desired selection and sequencing of storylines and environmental outputs, the process 50( )ends. If not, control returns to minimizing the cost function in step 530 and process iterates again.

Figure 6:
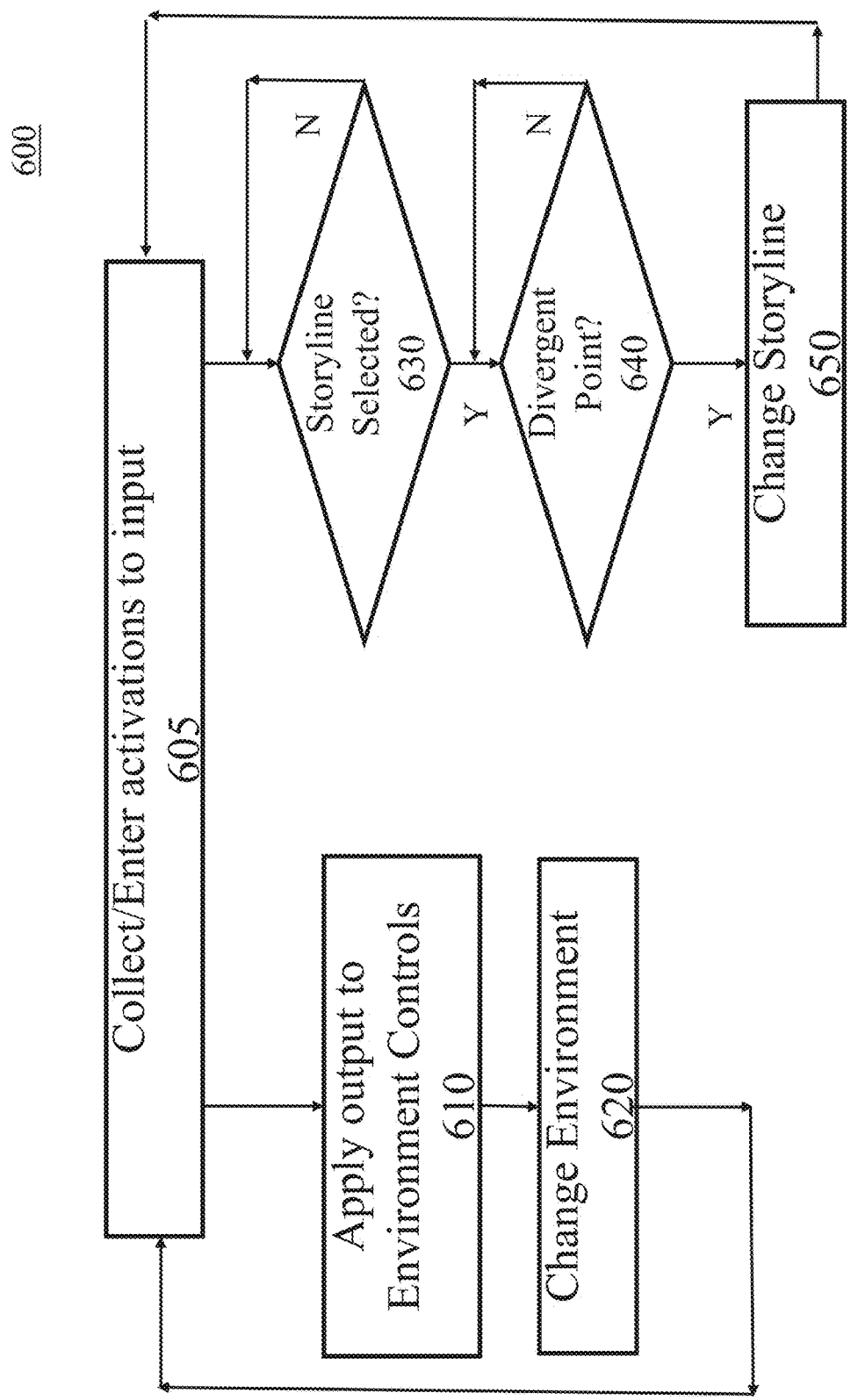
FIG. 6 is a flow chart of an operating process showing the steps of one embodiment of the present invention operating.

FIG. 6 is a flow chart of an operating process 600 shoving the steps of one embodiment of the present invention operating.

In step 605, the output of the situation context module 120 is entered 605 to the situation context sublayer 452 as the pattern of activations 410 representing the status of the sentiment/reaction 260 of the audience 250. The output of the background context module 130 is entered 605 in the background context sublayer 454 as the pattern of activations 410 representing the status of the background context status at a point in time, i.e., the status of the user/audience 250 profile of characteristics. The output of the environmental module 140 is entered 605 into the environmental sublayer 456 as a pattern of activations 410 representing a status of the environmental parameters in an environmental profile.

In step 610, the output of sublayer 484 is provided to environmental controller 170. Output of the environmental controller 170 controls environmental outputs 114 through the I/O controller and buses 115 to change the environment 620.

In step 610, the output of sublayer 482 is provided to the selection module 150 and the sequencing module 165. The selection module 150 determines from the pattern of activations in the sublayer 482 which storylines 283 are being selecting to be played. The sequencing module 165 determines the sequencing in which to play the selected storylines.

In step 630 of one embodiment, the selection module 150 goes through a list of available storylines. If a storyline is not selected, it continues through the list until encounters and selects all storylines designated by the pattern of activations of the sublayer 482. In alternative embodiments, the pattern of activations of the sublayer 482 directly identifies which storylines are selected.

From the pattern of activations of sublayer 482, the sequencing module 165 determines the sequence in which the selected storylines are played. The pattern of activations of sublayer 482 also determine the divergent points at which the selected storylines begin and end. Step 640 monitors the playing of the story or the sequence in which the story will be played. In step 640, the sequencing module 165 determines if a divergent point has been reached and if the sequencing module 165 needs to modify (e.g. add, delete, insert) one of the selected storylines at this divergent point. If not, the sequencing module waits until the next divergent point is reached and the determination is made again.

If a storyline from the selected storylines needs to be played at a divergent point, the storyline changes in step 650. The new storyline is played and ended at an appropriate divergent point (e.g., as indicated by the pattern of activation of sublayer 482) and the original storyline is not played at this point in the sequence.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A storyline control system comprising:
 a neural network circuit having an input layer, one or more hidden layers, and an output layer, the input layer having a situation context input sublayer and an environmental input sublayer and the output layer having a selection/sequencing output sublayer and an environmental output sublayer, each of the layers having a plurality of neurons, each of the neurons having an activation;
 one or more situation context circuits each having one or more context inputs from one or more sensors monitoring an audience and one or more sentiment outputs connected to the situation context input sublayer;

one or more environmental information circuits having one or more environmental sensor inputs and an environmental output connected to the environmental input sublayer;

one or more selection circuits connected to the selection/sequencing output sublayer, and one or more sequencing circuits connected to the selection/sequencing output sublayer, wherein the one or more selection circuits selects one or more selected storylines and the one or more sequencing circuits sequences the selected storylines into a story that is played.

2. A system, as in claim 1, where the context inputs include one or more of the following: a facial image, an infrared image, an audio input, an audio volume level detector, a text, a spoken word, a cellular phone input, a heartbeat, a blood pressure, and a respiratory rate.

3. A system, as in claim 1,
where the one or more situation context circuits performs one or more of the following functions: facial recognition, position recognition, natural language processing (NLP), recognition of key phrases, and speech recognition.

4. A system, as in claim 1, where the sentiment outputs represent one or more of the following audience sentiments: feelings, emotion, laughter, sadness, anticipation, fear, excitement, reactions to an environment, reaction to one or more storylines.

5. A system, as in claim 1, where the environmental sensor inputs include one or more of the following: an audio capture device, a microphone, a video capture device, a camera, an infrared camera, a network connection, a weather input, a location sensor, a cellular phone, a thermometer, a humidity detector, an air flow detector, a light intensity detector, a light detector, and a motion sensor.

6. A system, as in claim 1, where the environmental outputs include one or more of the following: a volume control, a lighting control, a temperature control, a humidity control, a heating system control, a cooling system control, and an air flow control.

7. A system, as in claim 1, where the one or more selection circuits selects one or more of the selected storylines based on a dynamic pattern of sentiment outputs and a dynamic pattern of environmental outputs as processed by the neural network.

8. A system, as in claim 1, the one or more sequencing circuits sequences one or more of the selected storylines based on a dynamic pattern of sentiment outputs and a dynamic pattern of environmental outputs as processed by the neural network.

9. A system, as in claim 1, where the neural network circuit is a convolutional neural network (CNN).

10. A system, as in claim 1, where one or more of the selected storylines starts at a diverging point and ends at a diverging point.

11. A storyline control system comprising:
a neural network circuit having an input layer, one or more hidden layers, and an output layer, the input layer having a situation context input sublayer, a background context input sublayer, and an environmental input sublayer and the output layer having a selection/sequencing output sublayer and an environmental output sublayer, each of the layers having a plurality of neurons, each of the neurons having an activation;

one or more situation context circuits each having one or more context inputs from one or more sensors monitoring an audience and one or more sentiment outputs connected to the situation context input sublayer;

one or more environmental information circuits having one or more environmental sensor inputs and an environmental output connected to the environmental input sublayer;

one or more selection circuits connected to the selection/sequencing output sublayer, and one or more sequencing circuits connected to the selection/sequencing output sublayer, wherein the one or more selection circuits selects one or more selected storylines and the one or more sequencing circuits sequences the selected storylines into a story that is played.

12. A system, as in claim 11, where the activation of one or more neurons in the background context input sublayer include a representation of one or more of the following: demographics, age, education level, socio-economic status, income level, social and political viewpoints, user profiles, likes, dislikes, time of day, number of users in the audience, weather, and location of the audience.

13. System, as in claim 11, where the background context information of one or more users is developed from one or more of the following sources: social media postings, social media usage, cellular phone usage, audience surveys, search histories, calendars, system clocks, image analysis, and position information.

14. A system, as in claim 11, where the one or more selection circuits selects one or more of the selected storylines and the sequencing module sequences one or more of the selected storylines based on a dynamic pattern of sentiment outputs, background context, and environmental outputs as processed by the neural network.

15. A system, as in claim 11, where the story is played for an audience including one or more of the following: family members viewing TV, a group seeing movie, a group playing a video game, a crowd at an entertainment venue, a commercial audience, a classroom of students, a group at a theme park, a movie theatre audience, and people attending an athletic or political event.

16. A system, as in claim 11, further comprising an environmental output sublayer has a pattern of environmental sublayer outputs that control one or more of the following: a volume control, a lighting control, a temperature control, a humidity control, a heating system control, a cooling system control, and an air glow control.

17. A method of training a neural network, comprising the steps of:
entering a sentiment activation into a sentiment neuron in a situation context input sublayer for a plurality of sentiment activation and sentiment neurons, respectively, the situation context input sublayer being part of an input layer of the neural network, the sentiment activations forming a sentiment input pattern;

entering an environmental activation into an environmental neuron in an environmental input sublayer for a plurality of environmental activation and environmental neurons, respectively, the environmental input sublayer being part of an input layer of the neural network, the environmental activations forming an environmental input pattern;

propagating the sentiment input pattern and the environmental input pattern through the neural network;

determining how to change one or more weights and one or more biases by minimizing a cost function applied to an output layer of the neural network, the output layer having a selection/sequencing output sublayer and an environmental output sublayer each with output activations;

backwardly propagating to change the weights and biases; and repeating the last two steps until the output activations reach a desired result causing the training to end.

18. A method, as in claim 17, where after the training ends, further comprising the steps of:

selecting one or more selected storylines;

inserting the selected storyline within an initial story, a start point of the selected storyline being started at a starting divergent point of the initial story and an end point of the selected storyline being ended at an ending divergent point of the initial story.

19. A method, as in claim 18, where the environmental output layer has a dynamic pattern of output activations controlling one or more environmental outputs associated with the selected storyline.

20. A method, as in claim 18, where the selecting of the selected storylines and a sequencing of the selected storylines is determined by a dynamic sentiment input pattern.

\* \* \* \* \*